United States Patent [19]

Olimpio

[11] Patent Number: 4,708,259

[45] Date of Patent: Nov. 24, 1987

[54] LID AND CONTAINER FOR ACCUMULATORS

[76] Inventor: Stocchiero Olimpio, 4 Via Kennedy, 36050 Montorso Vicentino, Italy

[21] Appl. No.: 6,150

[22] Filed: Jan. 23, 1987

[30] Foreign Application Priority Data

Jan. 24, 1986 [IT] Italy .............................. 85507 A/86

[51] Int. Cl.$^4$ ....................... B65D 41/16; B65D 41/18
[52] U.S. Cl. ..................................... 220/306; 220/307
[58] Field of Search .............................. 220/306, 307

[56] References Cited

U.S. PATENT DOCUMENTS

| 3,297,193 | 1/1967 | Stevens, Jr. .......................... 220/306 |
| 3,684,817 | 8/1972 | Card, Jr. et al. ..................... 220/306 |
| 3,957,539 | 5/1976 | Hayes, Jr. et al. . | |

FOREIGN PATENT DOCUMENTS

| 0037435 | 10/1981 | European Pat. Off. . |
| 0082826 | 12/1982 | European Pat. Off. . |
| 3346243 | 12/1983 | Fed. Rep. of Germany . |

Primary Examiner—George T. Hall

Attorney, Agent, or Firm—Birch, Stewart, Kolasch & Birch

[57] ABSTRACT

The lid of the invention is suited to be closed by pressure on containers for electric accumulators, without the need for welding or gluing. Said lid (4; 20) presents two perimetric edges (5, 6; 21, 22), each of which goes to contrast against the vertical walls (3, 11; 24) of the container (1; 25) by means of at least a projection (7, 9; 23) forming a continuous tightening cord. Moreover, on at least one of the two edges (5, 6; 21, 22) a cog (8, 10; 26) is foreseen, said cog being seated in an indentation of the container, thereby preventing it from coming out. The container is of the type obtained with the blow-moulding process and it presents at its upper edge a perimetric indentation (24) or impression (2) with an indentation (11) suited to block at least one cog belonging to one of the two lid edges. The lid has an external edge which does not protrude in relation to the overall surface of the container. By elastically deforming the edges, it is however possible to remove the lid from the container without causing any damage.

7 Claims, 5 Drawing Figures

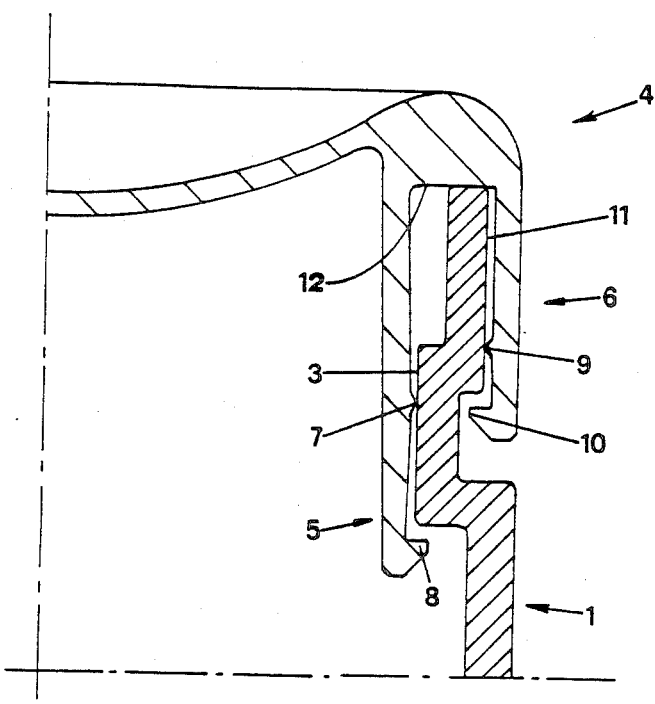
FIG. 3
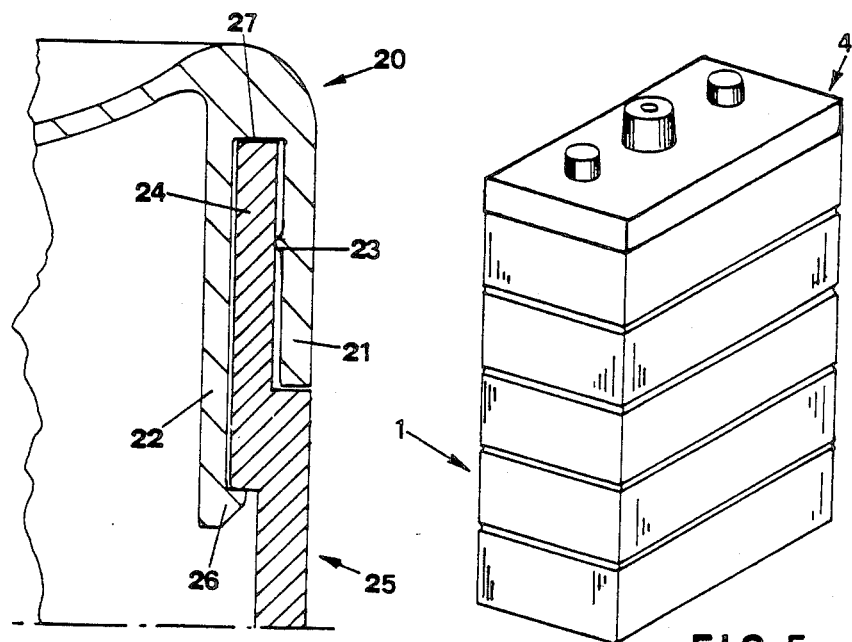
FIG. 4
FIG. 5

LID AND CONTAINER FOR ACCUMULATORS

The present invention refers to a lid for accumulators and to the container suited to receive it.

It is known that the lids of electric accumulators are joined to their tank or container in a permanent way and so as to insure a good tightness between the lid and the container. The tightness is necessary both because the leaking of the electrolyte during the operation of the accumulator can only be avoided by a good tightness, and because only the hermetical tightness garantees the good functioning of some automatic re-filling systems of the electrolyte.

For this reason, all the accumulators now found on the market have their lids welded to the container either through the direct melting of the plastic material or by gluing.

The welding done both with the hot metal-plate system and with the ultra-sound system forms a line of welding, which must be trimmed with suitable devices.

Although the welding between the lid and the container is present practically on all the accumulators, said welding presents some relevant disadvantages.

The most important disadvantage consists in the fact that the welded lids can never be taken off again, unless the lid itself is destroyed and the content is damaged.

Therefore, when the accumulator breaks down, for instance because of a short circuit between the plates, an economical repair is not possible since, as it has been said, the access to the accumulator plates entails the opening of the same by breaking open the lid.

Especially if reference is made to industrial accumulators, for instance to the ones used for traction, it can be noticed how advantageous it would be, if these accumulators, which are usually rather costly, could be repaired.

On the other hand, it is not possible to resume the use of accumulators having their lids sealed with putty as was the case in the old constructions, since that system is very costly.

Another inconvenience ensuing from the welding between the lid and the container concerns the fact that the welding operation itself and the subsequent, almost unavoidable, trimming operation, are costly operations, requiring special equipment.

The purpose of the present invention is that of overcoming the just mentioned inconveniences.

In particular, the purpose is that of obtaining a lid suited to be joined with accumulator containers in a stable way and with good tightness, without making it necessary, for this reason, to weld the lid and the container together.

Another purpose is that of obtaining that the lid may be positioned by means of pressure on the container, so that it can also be removed, if necessary, so that the access for the eventual maintenance of the battery may be made possible.

The above-mentioned purposes and others which will be better explained hereafter, are obtained with the construction of a lid made of plastic material, suited to be coupled by simple pressure with accumulator containers, which, in accordance with the patent claims, is characterized by the fact that it presents a double perimetrical edge, in which at least one of said edges presents at least one continuous projection cooperating with the vertical walls of the container, and in which said container presents a perimetric external impression in bas-relief or an indentation on which the cogs being present on the terminal part of at least one edge of the lid get caught.

Other characteristics and advantages will be better understood from the description of a preferred form of execution of the lid being the object of the invention, which is given in the way of example only, but which is not meant to limit the scope of the invention, and which is illustrated in the enclosed tables of drawing, where:

FIG. 3 shows a cross-section of the lid and the container being coupled.

FIG. 4 shows a cross-section of a variation of the lid of FIG. 1 with the respective suitable container.

FIG. 5 shows a view of an accumulator with the lid of the invention.

Figure 1:
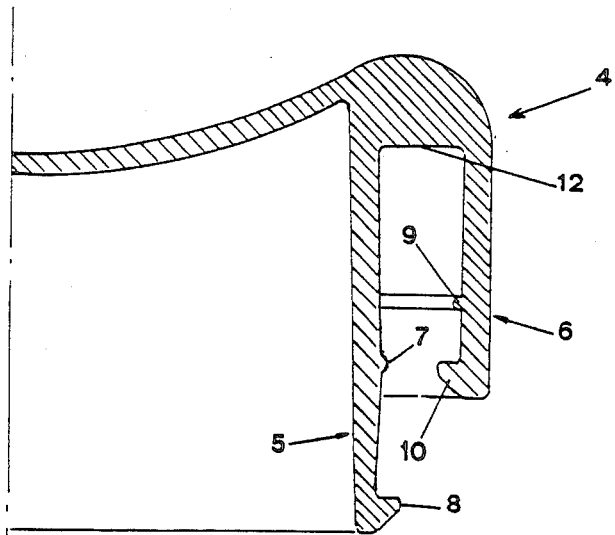
FIG. 1 shows a partial cross-section of the lid of the invention.
Figure 2:
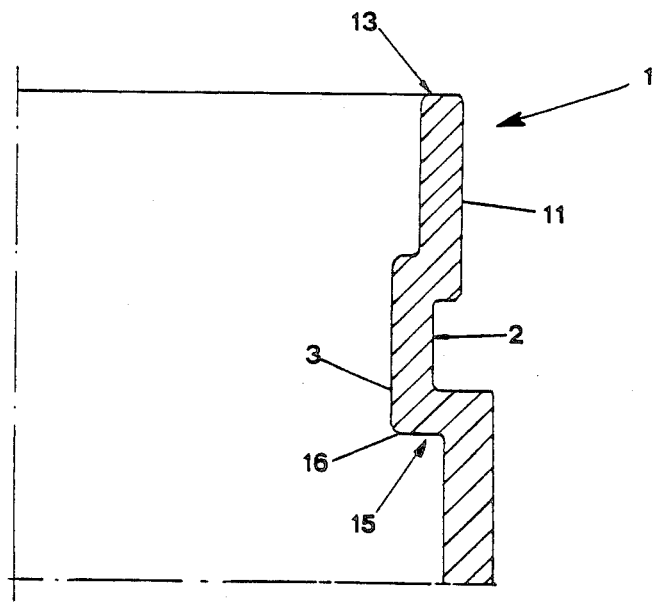
FIG. 2 shows a cross-section of the edge of the accumulator container receiving the lid of FIG. 1.

With reference to the mentioned drawings, in FIG. 2 a cross-section of the profile of an accumulator container 1 can be observed. This container, made of plastic material, is of the type which is obtained by blow-moulding.

As it is known and as it has been described in the application for the European Pat. No. EP-0082826, with the blow-moulding process it is possible to obtain containers presenting even indented channel-shaped impressions along the perimeter, as can be observed in the cross-section of FIG. 2 and as it is also visible in the perspective view of FIG. 5. More specifically, the indented impression 2, which is present near the upper edge of container 1, and the vertical surface 3 inside the container being formed by indentation 2, are meant, in this embodiment, for the anchorage of lid 4, as will be explained later on.

In fact, lid 4, also being preferably made of plastic material, presents two edges, 5 and 6, having vertical profiles differring from each other, but with characteristics in common. In both edges, in fact, there are two projections 7 and 9 in relief on the vertical surface and turned in such a direction, so that they will be in contact with the wall of container 1.

More precisely, the inside edge 5 of lid 1 presents a projection 7 having a practically semi-circular section and a cog 8 at the lower end of the edge. Thus the outside edge also presents a projection 9 having a practically semi-circular section and a cog 10 on the lower end of the edge.

When the lid is closed by pressure against the edge of container 1, the elasticity of the material and the shape of the lid edges allow the edges 5 and 6 to open, so as to leave the space necessary for the insertion of the edge of container 1. When the lid is inserted along the entire perimetrical edge, the areas of tightness between the lid and the container are at least three, namely, the entire rim 7 of the the internal edge of the lid which presses on the inside surface 3 of the container, the entire rim 9 of the external edge of the lid, which presses against the external surface 11 of the container, and the flat area 12 of the container being comprised between the edges 5 and 6, which engages edge 13 of the container.

Since the distance between projection 7 and projection 9 of the lid, when the lid is separated from the container, is shorter than the distance between the two surfaces 3 and 11 of the container, it can be understood that, when the lid is placed on the container, the projections 7 and 9 exert pressure against the walls 3 and 11 of the container, thus insuring the tightness.

Experimentally it has been noticed that a good degree of tightness between the lid and the container is reached when the minus difference between the distance of the projections 7 and 9, on one hand, and of the surfaces 3 and 11, on the other, is of about 1.5 mm. The cogs 8 and 10 of the lid, as can be seen in the cross-section of FIG. 3, are left free, but respectively inserted in the impressions 15 and 2 of the container. Thus, during the aging process of the accumulator, when the poles tend to lengthen and the lid receives a push upwards, which is partly absorbed by the deformability of the lid surface, the cogs 8 and 10 prevent the opening between the lid and the container.

When, on the other hand, the accumulator needs to be re-opened, for instance, in order to perform the repair of a short-circuited plate, this can be done by acting on the elastic deformation of the outside wall 6 of the edge. In fact, cog 8 is able to go over the rim 16, since this is sufficiently radiused.

A variation concerning the lid of the invention is represented in FIG. 4, where lid 20 also presents two perimetric edges 21 and 22, but, in this case, there is only one projection 23, being present on the wall of the external edge 21, which cooperates with the indented edge 24 of container 25.

Besides, on the lid there is only one cog 26 which resists the releasing tension of the lid.

In this variation, container 25 presents a simplified shape with a single perimetric indentation 24 along its edge. This indentation is dimensioned so that the shape of the external edge 21 of lid 20 does not protrude in relation to the vertical wall of container 25.

The tightness between lid 20 and container 25, in this case, is insured by the perimetric rim 23, by the flat edge 27 of the container, which is in contact with lid 20, and by the contact between the vertical surfaces of the inside edge 22 and of the indentation 24 of the container.

It is important to point out that, in each of the two given examples, the external edge of the lid never protrudes in relation to the vertical walls of the container. Thus it is possible to build an accumulator battery without losing any space between an accumulator and the next one.

From the description of the examples of the forms of execution given above, it can be seen that with the lid of the invention, the tightness between the lid and the container is obtained without any need for welding, in order to obtain it. Moreover, the lid can be removed in case of break down of the accumulator by using its elasticity and without breaking neither the lid nor the container.

It will be possible to introduce variations, either in the construction or the form of the present invention. For instance, the form or the number or the position of the projections 7 and 9 of the two edges, as well as the shape and the position of the cogs 8 and 10, or the shape of the container impression receiving the lid may be varied. All this can be done without exceeding the scope of the invention, as it is described in the following claims.

I claim:

1. A lid for accumulator container, made of plastic material and suited to be fixed on containers (1; 25) presenting at least a perimetric external impression in bas-relief, characterized by the fact that it presents two perimetric edges (5, 6; 21, 22), each of them going to contrast against the vertical walls (3, 11; 24) of the container (1; 25), and in which at least one of the edges presents a projection (7, 9; 23) forming a continuous cord tightening on the container and a cog (8, 10) hooking the impression of the container, said cog not being necessarily present on the edge itself.

2. A lid according to claim 1 characterized by the fact that each of the two perimetric edges (5, 6) presents a projection (7, 9) and that said projections contrast respectively with the internal wall (3) and the external wall (11) of the container and insure the tightness between the container and the lid.

3. A lid according to claim 2 characterized by the fact that the projection (7, 9) being present on the edges has practically a semicircular shaped section.

4. A lid according to claim 1 characterized by the fact that at least one of the two edges (5, 6) of said lid presents at its terminal end a protrusion in the shape of a cog (8, 10) leaning against the horizontal wall of the container when the lid tends to disconnect itself from its seat.

5. A lid according to claim 4 characterized by the fact that each one of the two perimetric edges leans (5,6) presents a cog which against the horizontal wall of the container indentation, when said lid tends to disconnect itself from its seat.

6. A container for accumulators, made of plastic material and obtained by the blow-moulding process, suited to be coupled with the lid described under claim 1, characterized by the fact that it presents at its upper edge an indentation (24) or a perimetric impression (2) with an indentation (11), each of them being suited to block at least one cog (8, 10; 26) belonging to one of the two lid edges (4, 20).

7. A container according to claim 6, characterized by the fact that the indentation (11, 24) is such, that the walls of the external edge do not protrude outside the vertical walls of said container (1, 25).

* * * * *